US012717155B2

(12) United States Patent
Shi et al.

(10) Patent No.: US 12,717,155 B2
(45) Date of Patent: Aug. 25, 2026

(54) OPTICAL LENS ASSEMBLY, OPTICAL SYSTEM AND HEAD-MOUNTED DISPLAY DEVICE

(71) Applicant: Goertek Optical Technology Co., Ltd., Weifang (CN)

(72) Inventors: Chaiyuan Shi, Shandong (CN); Wenbao Song, Weifang (CN); Huihui Hu, Weifang (CN)

(73) Assignee: Goertek Optical Technology Co., Ltd., Weifang (CN)

(*) Notice: Subject to any disclaimer, the term of this patent is extended or adjusted under 35 U.S.C. 154(b) by 266 days.

(21) Appl. No.: 18/288,878

(22) PCT Filed: Nov. 26, 2021

(86) PCT No.: PCT/CN2021/133311

§ 371 (c)(1),
(2) Date: Oct. 30, 2023

(87) PCT Pub. No.: WO2022/227540

PCT Pub. Date: Nov. 3, 2022

(65) Prior Publication Data

US 2024/0210716 A1 Jun. 27, 2024

(30) Foreign Application Priority Data

Apr. 30, 2021 (CN) ......................... 202110489112.8

(51) Int. Cl.
*G02B 27/28* (2006.01)
*G02B 27/01* (2006.01)

(52) U.S. Cl.
CPC ....... *G02B 27/286* (2013.01); *G02B 27/0172* (2013.01); *G02B 27/283* (2013.01)

(58) Field of Classification Search
CPC . G02B 27/286; G02B 27/0172; G02B 27/283
USPC .................................... 359/630–631, 486.02
See application file for complete search history.

(56) References Cited

U.S. PATENT DOCUMENTS 2,617,329 A * 11/1952 Dreyer ................ G02B 27/281 160/166.1
3,443,858 A * 5/1969 La Russa .............. G02B 27/28 359/489.07
5,841,581 A * 11/1998 Tutt ......................... G02B 5/30 359/486.03

(Continued)

FOREIGN PATENT DOCUMENTS

| CN | 109960038 A | 11/2018 |
|---|---|---|
| CN | 211375190 U | 8/2020 |
| CN | 113219665 A | 8/2021 |

*Primary Examiner* — George G. King
(74) *Attorney, Agent, or Firm* — Baker Botts LLP

(57) ABSTRACT

Disclosed are an optical lens assembly, an optical system and a head-mounted display device. The optical lens assembly includes: a lens body including a light incident surface through which light rays enter and a light exit surface through which light rays exit; a transflective film provided on the light incident surface; a polarizing conversion device provided on the light exit surface; and a polarizing reflection device provided on one side of the polarizing conversion device facing away from the lens body, the polarizing reflection device comprising a first polarizing reflector and a second polarizing reflector provided sequentially along a propagation direction for light rays.

10 Claims, 8 Drawing Sheets

(56) References Cited

U.S. PATENT DOCUMENTS

| | | | | |
|---|---|---|---|---|
| 6,080,980 | A * | 6/2000 | Steinle | G02B 27/283 359/489.17 |
| 6,094,242 | A * | 7/2000 | Yamanaka | G02B 27/28 349/98 |
| 2005/0111101 | A1* | 5/2005 | Dike | G02B 27/28 359/489.07 |
| 2007/0070508 | A1* | 3/2007 | Ruhle | G02B 5/3016 359/630 |
| 2010/0177113 | A1* | 7/2010 | Gay | G02B 30/27 359/484.04 |
| 2018/0101020 | A1* | 4/2018 | Gollier | G02B 27/022 |
| 2020/0192126 | A1* | 6/2020 | Yun | G02C 7/06 |

* cited by examiner

OPTICAL LENS ASSEMBLY, OPTICAL SYSTEM AND HEAD-MOUNTED DISPLAY DEVICE

CROSS-REFERENCE TO RELATED APPLICATIONS

This application is a National Stage of International Application No. PCT/CN2021/133311, filed on Nov. 26, 2021, which claims priority to Chinese Patent Application No. 202110489112.8, filed on Apr. 30, 2021, both of which are hereby incorporated by reference in their entireties.

TECHNICAL FIELD

The present disclosure relates to the technical field of optical display, in particular to an optical lens assembly, an optical system and a head-mounted display device.

BACKGROUND

A head-mounted display (HMD) device is an electronic product capable of providing immersive experience. Currently, head-mounted display devices are based on display principles including virtual reality (VR) technologies, augmented reality (AR) technologies and mixed reality (MR) technologies.

A head-mounted display device needs to image and display light rays accurately at the human eye position. The light rays need to pass through a sufficient optical path. For this reason, a head-mounted display device must have enough light path propagation space, which results in a bulky head-mounted display device inconvenient for users to use and wear.

SUMMARY

In view of the above, regarding the problem that existing head-mounted display devices are bulky and inconvenient for users to use and wear, it is necessary to provide an optical lens assembly, an optical system and a head-mounted display device, aiming to reduce size of the head-mounted display device and facilitate its using and wearing for the users.

In order to achieve the above object, the present disclosure provides an optical lens assembly, which includes:

- a lens body, including a light incident surface through which light rays enter, and a light exit surface through which light rays exit;
- a transflective film, provided on the light incident surface;
- a polarizing conversion device, provided on the light exit surface; and
- a polarizing reflection device, provided on one side of the polarizing conversion device facing away from the lens body, the polarizing reflection device comprising a first polarizing reflector and a second polarizing reflector provided sequentially along a propagation direction for light rays;
- wherein light rays having passed through the polarizing conversion device are in a first polarization state or a second polarization state; the first polarizing reflector includes in a surface thereof a first region and a second region, the first region transmitting light rays in the first polarization state, the second region reflecting light rays in the first polarization state and transmitting light rays in the second polarization state; and the second polarizing reflector reflects light rays in the second polarization state and transmits light rays in the first polarization state.

Optionally, there are provided several first regions and several second regions distributed in the surface of the first polarizing reflector.

Optionally, the first regions and the second regions are provided in alternating sequence.

Optionally, the first regions and/or the second regions are evenly distributed in the surface of the first polarizing reflector.

Optionally, the first regions are of the same area size as the second regions.

Optionally, both the first regions and the second regions are of square shapes.

Optionally, the polarizing conversion device is a quarter-wave plate, and both the first polarizing reflector and the second polarizing reflector are polarizing reflective films.

Optionally, the optical lens assembly further includes a stray-light eliminator provided on one side of the polarizing reflection device facing away from the lens body.

Optionally, the stray-light eliminator is a polarizer, with a transmission direction thereof being the same direction as the vibration direction of the light rays in the first polarization state.

In addition, in order to achieve the above object, the present disclosure also provides an optical system. The optical system includes a display and the optical lens assembly as described above, the display emits light; and the optical lens assembly receives the light emitted from the display and is of a total length of less than 6 mm.

Optionally, the optical system further includes a quarter-wave plate provided on a light exit surface of the display.

In addition, in order to achieve the above object, the present disclosure also provides a head-mounted display device, which includes a housing and an optical lens assembly as described above, and the optical lens assembly is provided in the housing.

In the technical solution proposed by the present disclosure, during emission to the lens body, light rays pass through the transflective film, via which one part of the light rays are reflected, and the other part of the light rays are transmitted. Light rays transmitting through the transflective film pass through the lens body. Light rays transmit to the polarizing conversion device, the polarization state of the light rays is converted to the first polarization state, and the light rays in the first polarization state is transmitted to the first polarizing reflector. The light rays in the first polarization state are reflected in the second region of the first polarizing reflector. The reflected light rays in the first polarization state emit to the transflective film, where the phenomenon of transmission and reflection occur under the action of the transflective film; The reflected light rays again goes to the polarizing conversion device, with the polarization state thereof being converted to the second polarization state. The light rays in the second polarization state undergo transmission both in the first region and the second region of the first polarizing reflector, and the transmitted light rays in the second polarization state go to the second polarizing reflector. Since the second polarizing reflector reflects the light rays in the second polarization state and transmits the light rays in the first polarization state, reflection occurs when light rays in the second polarization state hits the second polarizing reflector.

The reflected light rays in the second polarization state transmit through the first polarizing reflector and the polarizing conversion device, and are reflected again when passing through the transflective film. When the reflected light rays pass through the polarizing conversion device again, the light rays in the second polarization state are converted into the first polarization state. The light rays in the first polarization state undergo transmission when passing through the first region of the first polarizing reflector, and also undergo transmission when passing through the second polarizing reflector; thereby, the transmitted light rays in the first polarization state display an image at the position of the human eye. Under the action of the first polarizing reflector and the second polarizing reflector, the light rays are refracted and reflected twice, thereby meeting the optical path requirements within a smaller area, and reducing the size of the HMD device so that it is convenient for users to use and wear.

BRIEF DESCRIPTION OF THE DRAWINGS

Drawings to be used for description of embodiments of the present disclosure or the prior art will be briefly introduced below, in order to clearly demonstrate technical solutions thereof. It is obvious that drawings accompanying the following description only refer to some of the embodiments of the present disclosure, while other drawings can be derived by those skilled in the art based on the structures shown in these drawings without creative efforts.

REFERENCE SIGNS

Figure 1:
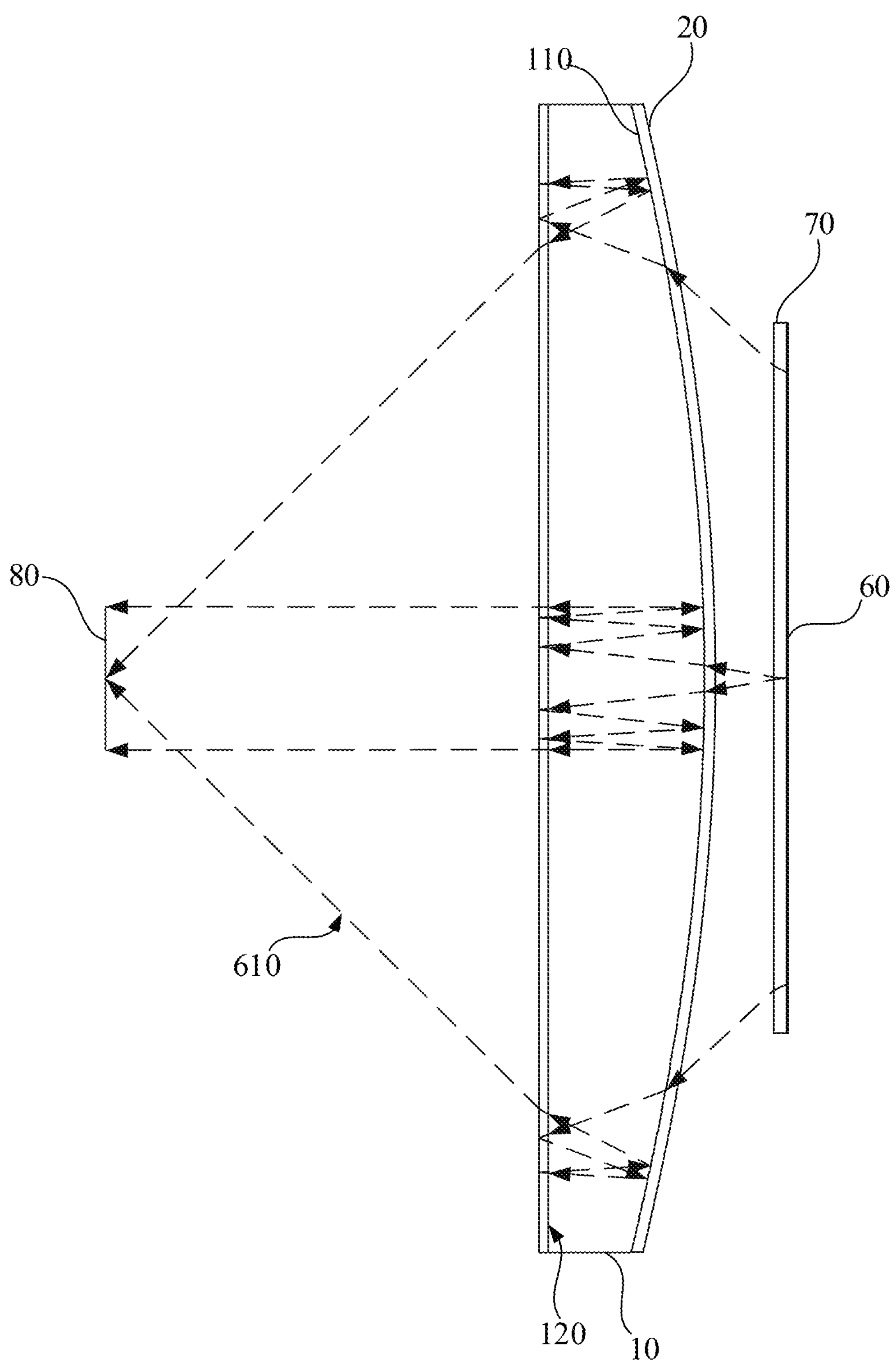
FIG. 1 is a schematic structural illustration of an optical lens assembly of the present disclosure.

| Reference Sign | Name | Label | Name |
|---|---|---|---|
| 10 | Lens Body | 412 | Second Region (s) |
| 110 | Light Incident Surface | 420 | Second Polarizing Reflector |
| 120 | Light Exit Surface | 50 | Stray-Light Eliminator |
| 20 | Transflective Film | 60 | Display |
| 30 | Polarizing conversion device | 610 | Light Ray(s) |
| 40 | Polarizing reflection device | 70 | Transparent Protector plate |
| 410 | First Polarizing Reflector | 80 | Human Eye Position |
| 411 | First Region (s) | | |

The present disclosure will be further described in combination with embodiments thereof, with reference to the accompanying drawings.

DETAILED DESCRIPTION

Embodiments of the present disclosure will be clearly and thoroughly described below with reference to the accompanying drawings in the embodiments of the present disclosure. Obviously, embodiments to be described are only part of, rather than all of the embodiments of the present disclosure. All other embodiments obtained based on the embodiments of the present disclosure by those of ordinary skill in the art without making creative efforts shall fall within the scope of protection of the present disclosure.

It should be noted that all directional indications (such as up, down, left, right, front, back . . . ) in the embodiments of the present disclosure are only for explaining relationship between the components arranged in a specific posture (as shown in the figure). Relative positional relationship, movement conditions, etc., if the specific posture changes, the directional indication will also change accordingly.

In addition, in the present disclosure, descriptions such as “first”, “second” and so on are used for descriptive purposes only, and should not be understood as indicating or implying their relative importance or implicitly indicating the quantity of indicated technical features. Thus, the features defined as “first” and “second” may explicitly or implicitly include at least one of these features. In the description of the present disclosure, “plurality” means at least two, such as two, three, etc., unless otherwise expressly and specifically defined.

In the present disclosure, unless otherwise clearly stated and defined, the terms “connection”, “fixing”, etc. should be understood in a broad sense. For example, a “fixing” can be a fixed connection, a detachable connection, or integrated as a whole; it can be a mechanical connection or an electrical connection; it can be a direct connection or an indirect connection via an intermediate medium; it can be an internal connection between two elements or an interactive relationship between two elements, unless otherwise clearly defined. For those of ordinary skill in the art, specific meanings of the above mentioned terms in the present disclosure may be interpreted according to specific scenarios.

In addition, the technical solutions between the various embodiments of the present disclosure may be combined with each other, however, any combination must be within what may be implementable by a person of ordinary skill in the art. Should a combination of technical solutions be contradictory or unimplementable, it is deemed that such a combination of technical solutions does not exist and is not within the protection scope as claimed by the present disclosure.

In technical fields in connection with head-mounted displays, a light ray must be transmitted through a sufficiently long optical path to conduct imaging and displaying at human eyes. However. transmissions of light rays require a sufficiently large space to accommodate optical paths of sufficient lengths, thereby leading to bulky HMDs which are very inconvenient for users to wear.

Figure 2:
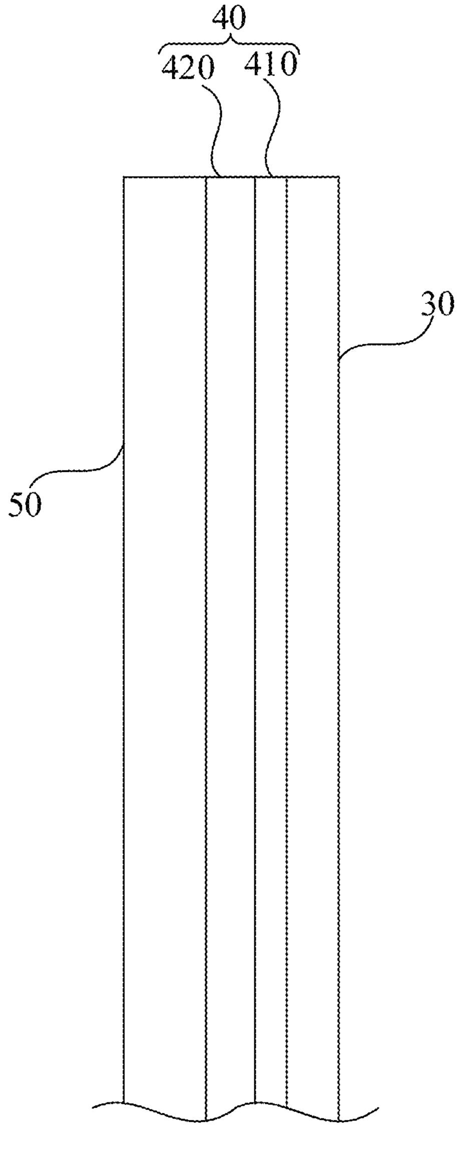
FIG. 2 is a schematic structural illustration of optical devices on the light exit surface of the optical lens assembly in FIG. 1.
Figure 3:
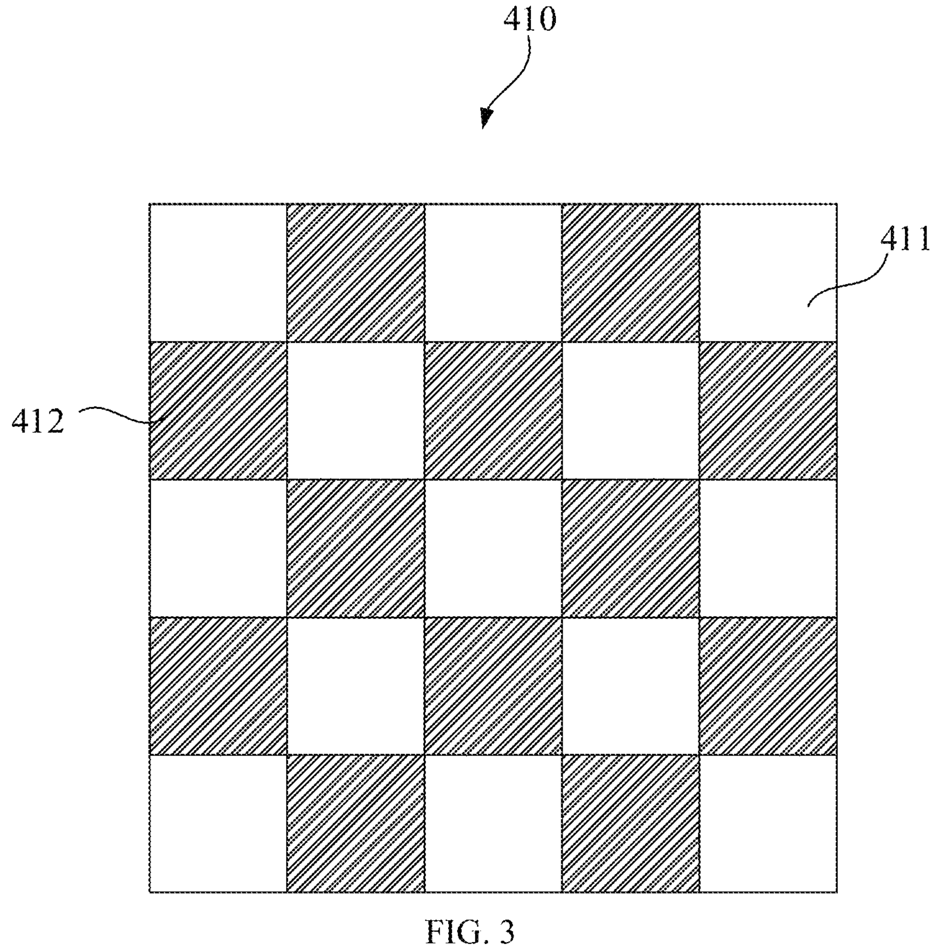
FIG. 3 is a schematic structural illustration of the first polarizing reflector in FIG. 2.

In order to solve the above problems, the present disclosure provides an optical lens assembly as shown in FIGS. 1 to 3, which includes a lens body 10, a transflective film 20, and a polarizing conversion device 30, the lens body 10 including a light incident surface 110 through which light rays enter, and a light exit surface 120 through which light rays exit. The lens body 10 may be a single lens or a lens assembly consisting of multiple lenses. The transflective film 20 is provided on the light-incident surface 110; the polarizing conversion device 30 is provided on the light-exit surface 120; the transflective film 20 can be provided on the light-incidence surface 110 by coating, or can be provided on the light-incidence surface 110 by pasting. Similarly, the polarizing conversion device 30 may also be provided on the light exit surface 120 by pasting. Here, the lens body 10 may be made from a transparent glass material or a transparent resin material. Glass materials are excellent in their optical properties, such as transmission properties, ensuring the amount of light being transmitted. Resin materials are easy to process, making it possible to obtain the lens body 10 by thermoplastic molding.

The optical lens assembly includes a polarizing reflection device 40, which is provided on one side of the polarizing conversion device 30 facing away from the lens body 10. The polarizing reflection device 40 includes a first polarizing reflector 410 and a second polarizing reflector 420 provided sequentially along a propagation direction for light rays. Similarly, the first polarizing reflector 410 and the second polarizing reflector 420 can also be provided on one side of the light exit surface 120 of the lens body 10 by pasting.

Light rays having passed through the polarizing conversion device 30 are in a first polarization state or a second polarization state. The first polarizing reflector 410 includes in a surface thereof a first region 411 and a second region 412, the first region 411 transmitting light rays in the first polarization state, the second region 412 reflecting light rays in the first polarization state and transmitting light rays in the second polarization state. The second polarizing reflector 420 reflects light rays in the second polarization state and transmits light rays in the first polarization state. For example, the first polarization state refers to S-polarized light, simplified as S light. The second polarization state refers to P polarized light, simplified as P light. In the case that S light passes through the first polarizing reflector 410, the second region 412 reflects the S light; and in the case that the S light passes through the second polarizing reflector, the S light will be transmitted therethrough. In the case that P light passes through the first polarizing reflector 410, it will directly transmit through the first polarizing reflector 410; and in the case that P light passes through the second polarizing reflector 420, the P light will be reflected. Of course, the first polarization state may also refer to P light, and the second polarization state may refer to S light. The first polarizing reflector 410 and the second polarizing reflector 420 reflect both S light and P light, and thus different film layer designs can be made as needed. The first region 411 can also transmit light rays in the second polarization state, that is, the first region 411 can ensure transmission of both light rays in the first polarization state and light rays in the second polarization state at the same time, i.e., the first region 411 of the lens body 10 where it is located can refrain from film layer treatment so as to allow light rays to directly pass through the lens body.

Further, it should be pointed out that the transflective film 20, the polarizing conversion device 30 and the polarizing reflection device 40 can be of a film layer structure, and can be respectively provided on both sides of the lens body 10; alternatively, they may be independent optical devices provided at a certain distance from the lens body 10.

In the technical solution proposed in this embodiment, when light rays transmit to the lens body 10, they first pass through the transflective film 20 where part of the light rays being reflected and other light rays being transmitted. Light rays transmitted through the transflective film 20 also pass through the lens body 10. For light rays transmitting to the polarizing conversion device 30, the polarization state thereof is converted into the first polarization state, and then light rays in the first polarization state transmit to the first polarizing reflector 410. The light rays in the first polarization state are reflected in the second region 412 of the first polarizing reflector 410. The reflected light rays in the first polarization state transmit to the transflective film 20, where the phenomena of transmission and reflection occur under the action of the transflective film 20. Then, the reflected light rays transmit to the polarizing conversion device 30 again, and the polarization state thereof is converted to the second polarization state. Light rays in the second polarization state are transmitted in both the first region 411 and the second region 412 of the first polarizing reflector 410, and the transmitted light rays in the second polarization state are transmitted to the second polarizing reflector 420. Since the second polarizing reflector 420 reflects the light rays in the second polarization state and transmits the light rays in the first polarization state, the light rays in the second polarization state are reflected upon hitting the second polarizing reflector 420. The reflected light rays in the second polarization state transmit through the first polarizing reflector 410 and the polarizing conversion device 30, and is reflected again upon passing through the transflective film 20. When the reflected light rays pass through the polarizing conversion device 30 again, the light rays in the second polarization state are converted into the first polarization state, while the light rays in the first polarization state transmit through the first region 411 of the first polarizing reflector upon passing therethrough, and also transmit through the second polarizing reflector 420 upon passing therethrough. As such, displaying and imaging at the human eye position 80 are conducted by the transmitted light rays in the first polarization state. Under the action of both the first polarizing reflector 410 and the second polarizing reflector 420, light rays are refracted and reflected twice, thereby meeting the optical path requirements within a smaller area, and reducing the size of the HMD device so that it is convenient for users to use and wear.

In one of the embodiments, in order to allow more light rays to complete two refractions and reflections, there are provided several first regions 411 and several second regions 412 distributed in the surface of the first polarizing reflector 410. It can be seen from provision of a plurality of second regions 412 that, more second regions 412 enable more light rays complete two refractions and two reflections, thereby enabling more and faster focused imaging at the human eye position 80.

Further, the number of the second regions 412 can be greater than the number of the first regions 411, or the total area occupied by the second regions 412 can be larger than the total area occupied by the first regions 411, so that more light will pass through the second region 412 and thereby increasing the probability that light rays in the first polarization state are reflected.

In one embodiment, in order to transmit light uniformly through the optical lens assembly and ensure uniform brightness of imaging, the first regions 411 and the second regions 412 are provided in alternating sequence. In this way, the first regions 411 and the second regions 412 are evenly distributed in the surface of the first polarizing reflector 410. It can also be said that the first regions 411 and the second regions 412 are provided at each angular position of the first polarizing reflector 410. Upon light rays passing through the optical lens assembly, light rays are transmitted from every position, resulting in the brightness of the formed display image more balanced.

In one embodiment, in order to further uniformize the brightness of the image displayed at the human eye position 80, the first region 411 and/or the second region 412 are evenly distributed in the surface of the first polarizing reflector 410. Specifically, there are three scenarios: the first scenario is that the first regions 411 are evenly distributed in the surface of the first polarizing reflector 410; the second scenario is that the second region 412 is evenly distributed in the surface of the first polarizing reflector 410; and the third scenario is that both the first region 411 and the second region 412 are evenly distributed in the surface of the first polarizing reflecting member 410.

In one of the embodiments, the first regions 411 is of the same area size as the second regions 412. "Of the same area size" means that the total area size of the first regions 411 is equal to that of the second regions 412, i.e., the total area occupied by the first regions 411 is of the same size as that occupied by the second regions 412; i.e., a ratio of the total area size of the first regions 411 to the total area size of the second regions 412 is 1 to 1. As such, when light rays in the first polarization state passes through the first polarizing reflector 410, the light rays are 50% transmitted and 50% reflected, ensuring a balance between transmitted and reflected light rays.

In addition, the number of light rays transmitting through the first polarizing reflector 410 can also be adjusted by adjusting the area sizes occupied by the first regions 411 and that occupied by the second regions 412. For example, the size ratio of the total areas occupied by the first region 411 to that occupied by the second regions 412 may be 4:5, or 5:4, or 2:3, or 3:2, etc.

In one of the embodiments, the first regions 411 and the second regions 412 are of square shapes. With the square shape design, the first regions 411 and the second regions 412 can be engaged seamlessly during arrangement thereof, thereby reducing invalid area therebetween, ensuring compact arrangement of the first regions 411 and the second regions 412 on the surface of the first polarizing reflector 410, and fully utilizing surface area of the first polarizing reflector 410.

In one embodiment, the polarizing conversion device 30 is a quarter-wave plate, and both the first polarizing reflector 410 and the second polarizing reflector 420 are polarizing reflective films. Specifically, when providing the first polarizing reflector 410, there may be no polarizing reflective films provided in the first regions 411, while polarizing reflective films are only provided in the second regions 412. As such, light rays in the first polarization state and light rays in the second polarization state can effectively transmit through the first regions 411 upon passing therethrough without being influenced by polarizing reflection film layers, while polarization and reflection only occur in the second regions 412. The polarizing reflective film layer of the second regions 412 has a polarized transmission direction, and the second polarizing reflector 420 also has a polarized transmission direction, wherein the polarized transmission direction of the second regions 412 is perpendicular to the polarized transmission direction of the second polarizing reflector 420. For example, light rays are circularly polarized when they hit the transflective film 20, wherein one part of the light rays is reflected and the remaining part of the light rays is transmitted. The light rays transmitted through the transflective film 20 pass through the lens body 10. When light rays go to the quarter-wave plate, polarization state of the light rays is converted to linear polarized, for example S-polarized light, and the S-polarized light goes to the first polarizing reflector 410. The polarized transmission direction of the second region 412 of the first polarizing reflector 410 is perpendicular to the S-polarized light, and the S-polarized light rays are reflected. The reflected S-polarized light rays pass through the quarter-wave plate and are converted into circularly polarized light. Light rays of the circularly polarized light are directed towards the transflective film 20, where the phenomena of transmission and reflection occur under the action of the transflective film 20. After being reflected by the transflective film 20, rotation directions of the circularly polarized light rays change, for example, from left handedness to right handedness. Then the light rays again hit the quarter-wave plate, and the polarization state of the light is converted to P-polarized light. P-polarized light can pass through the first region 411 without being influenced. The polarized transmission of the P-polarized light is the same as that of the second region 412. Light rays perpendicular to the P-polarized light pass through both the first region 411 and the second region 412 of the first polarizing reflector 410, and the transmitted P-polarized light rays go to the second polarizing reflector 420. Since the polarized transmission direction of the second polarizing reflector 420 is perpendicular to that of the P-polarized light, reflection occur again when P-polarized light rays go to the second polarizing reflector 420; when reflected light rays again pass through the quarter wave plate, the P-polarized light rays are converted into S-polarized light. S-polarized light rays transmit when passing through first regions 411 of the first polarizing reflector, and also transmit when passing through the second polarizing reflector. Accordingly, the transmitted S-polarized light rays conduct displaying and imaging at the human eye position 80.

In one embodiment, in order to eliminate stray light, the optical lens assembly further includes a stray-light eliminator 50, which is provided on a side of the polarizing reflection device 40 facing away from the lens body 10. When light rays pass through the first polarizing reflector 410 and the second polarizing reflector 420, a small part of light rays have a polarization direction different from that of the light rays in the first polarization state. This part of the light rays is stray light, which influences the imaging quality. By providing the stray-light eliminator 50, this part of the light rays can be effectively eliminated.

In one embodiment, in order to eliminate stray light more effectively, the stray-light eliminator may be a polarizer which has a transmission direction identical to the vibration direction of the light rays in the first polarization state. In this way, when the light rays transmitted through the second polarizing reflector 420 pass through the polarizer, only the light rays with the same transmission direction as the polarizer can pass through, thereby filtering out the stray light with a different polarization direction from the light rays in the first polarization state.

Figure 4:
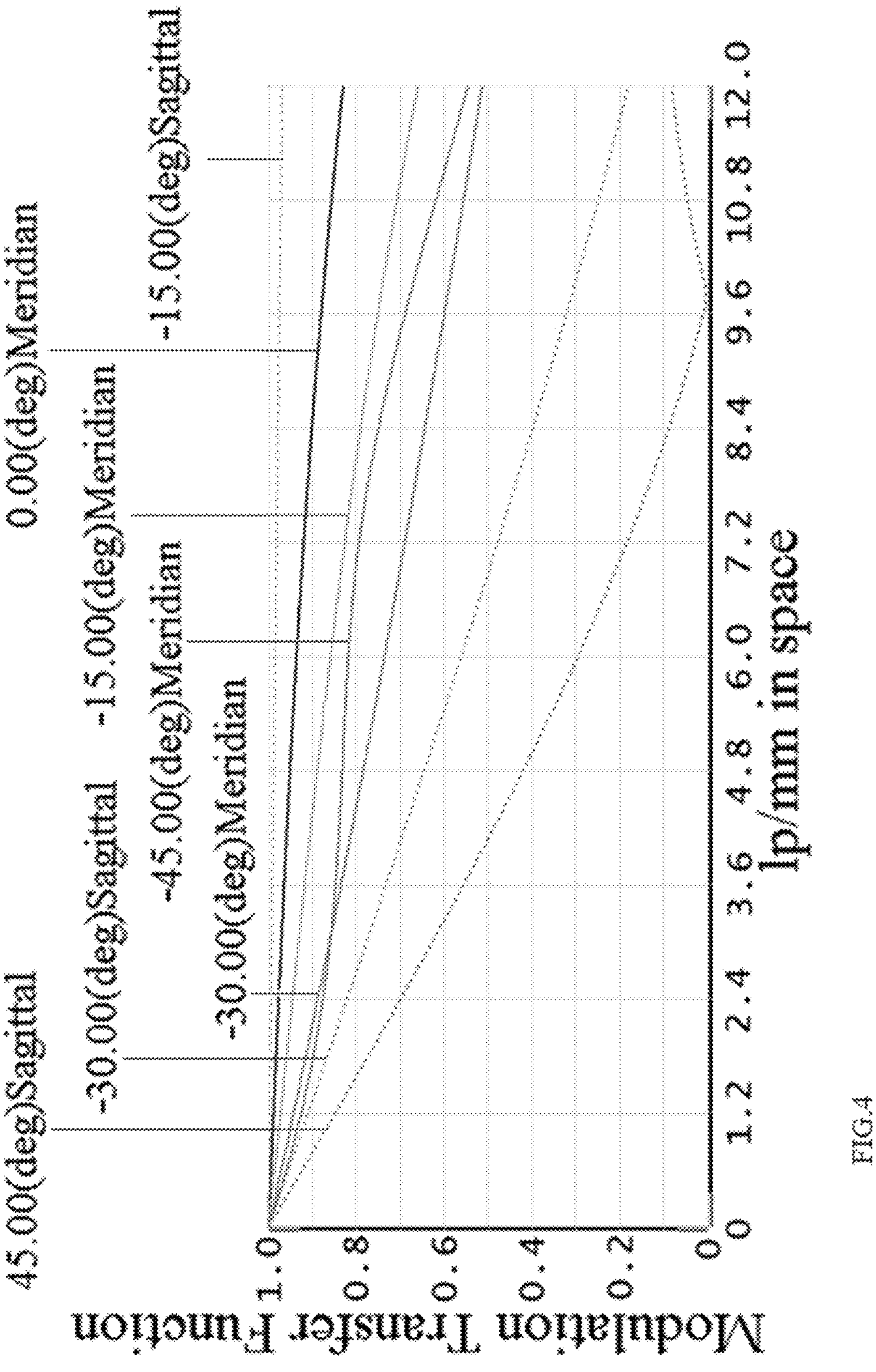
FIG. 4 is a modulation transfer function diagram of the optical lens assembly of the present disclosure.

FIG. 4 is a modulation transfer function diagram of the optical lens assembly of the present disclosure, that is, an MTF (Modulation Transfer Function) diagram. The MTF diagram refers to the relationship between the modulation degree and the number of line pairs per millimeter in the image, and is used to evaluate reproducibility of scene details, wherein the uppermost black solid line is a curve having theoretically no aberration. The closer to the black solid line, the better the imaging quality.

Figure 5:
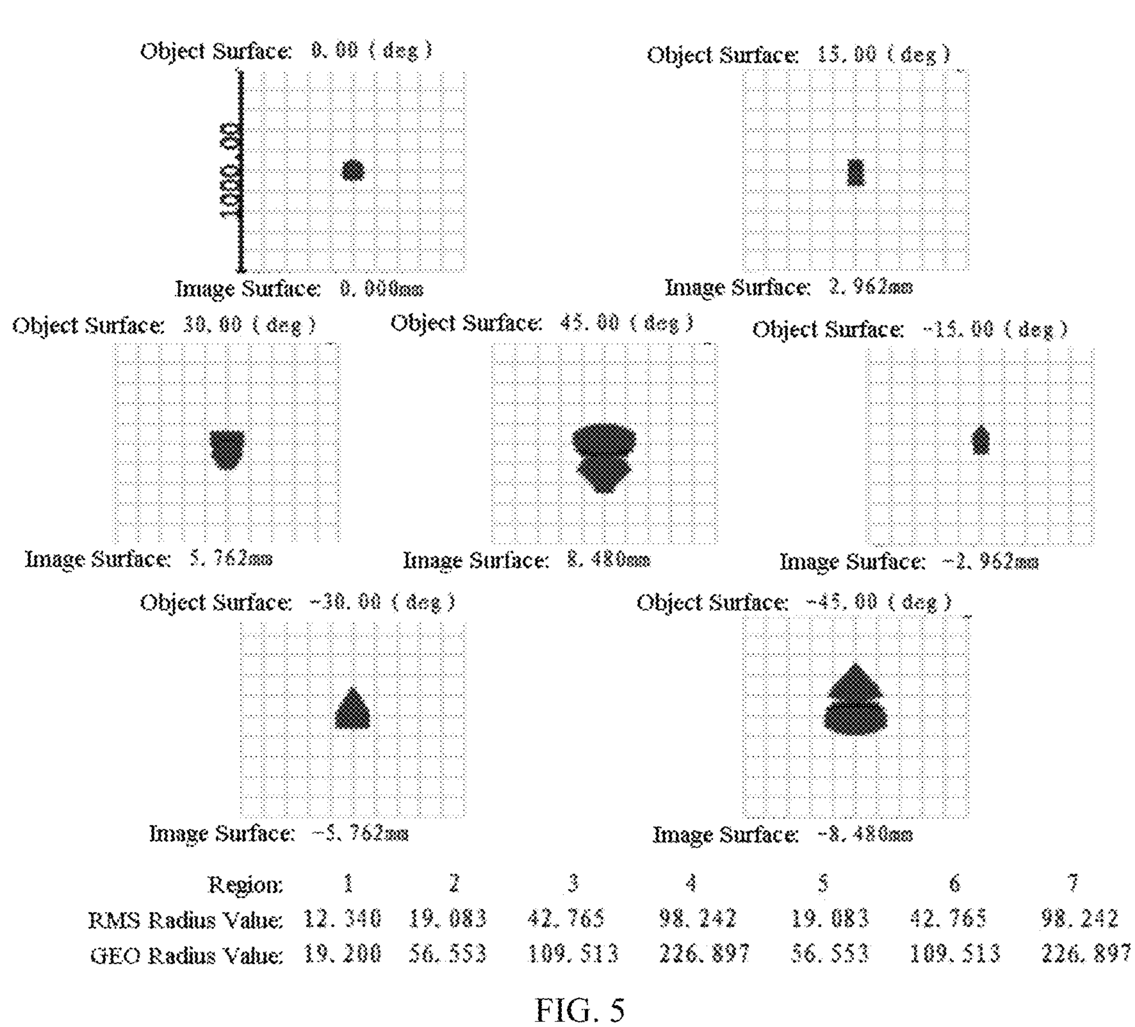
FIG. 5 is a spot diagram of the optical lens assembly of the present disclosure.

FIG. 5 is a spot diagram of the optical lens assembly of the present disclosure. The spot diagram means that, due to aberration, after many light rays emitted from one point pass through an optical component, their intersection points with the image plane are no longer concentrated at the same point, instead, the intersection points form a diffusion pattern scattered in a certain range which is used to evaluate imaging quality of a projection optical system. The smaller the root mean square radius value and geometric radius value, the better the imaging quality. Regions 1 to 7 are arranged in order from left to right and from top to bottom.

Figure 6:
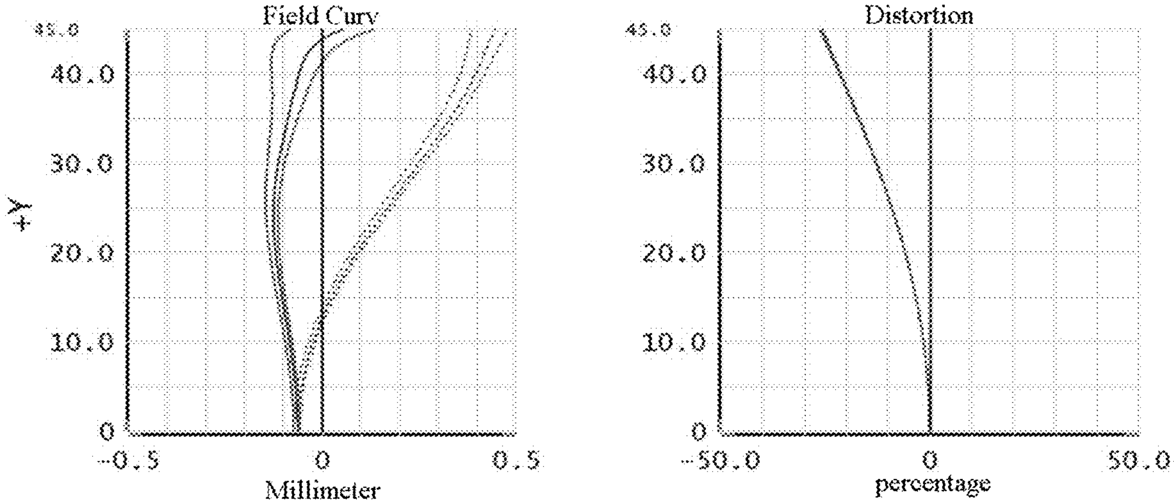
FIG. 6 is a field curvature and distortion diagram of the optical lens assembly of the present disclosure.

FIG. 6 is a field curvature and distortion diagram of the optical lens assembly of the present disclosure. Field curvature refers to the curvature of the image field, which is mainly used to indicate the degree of non-coincidence between the intersection point of the entire light beam and the ideal image point in the optical assembly. Distortion refers to the aberration of different parts of the object having different magnifications when the object is imaged through optical assembly. Distortion will cause the similarity of the object image to deteriorate, but it will not influence the clarity of the image.

Figure 7:
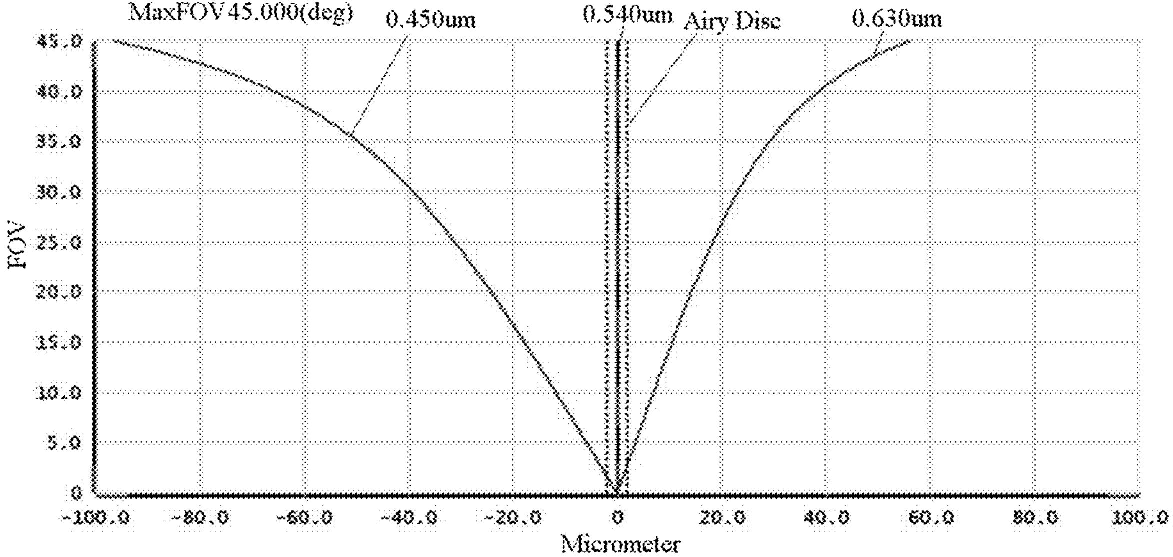
FIG. 7 is a chromatic aberration diagram of the optical lens assembly of the present disclosure.

FIG. 7 is a chromatic aberration diagram of the optical lens assembly of the present disclosure, wherein vertical axis chromatic aberration is also called magnification chromatic aberration, which mainly refers to a polychromatic major light ray on the object side becomes a plurality of rays due to the dispersion in a refraction system.

Figure 8:
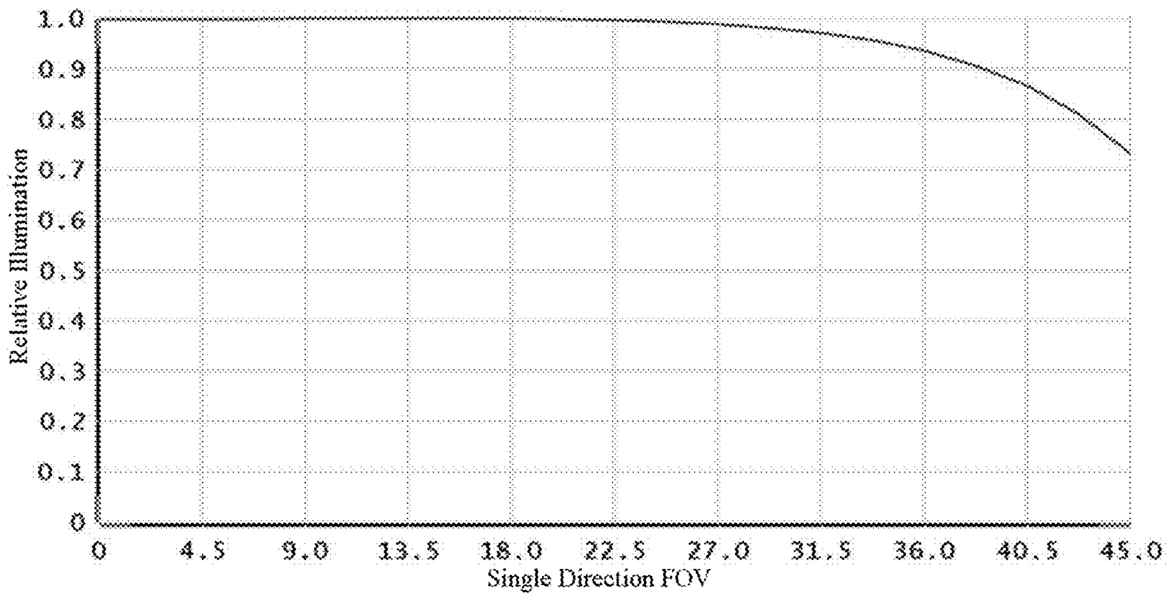
FIG. 8 is a relative illuminance diagram of the optical lens assembly of the present disclosure.

FIG. 8 is a relative illuminance diagram of the optical lens assembly of the present disclosure. An illuminance value measured in one viewing angle direction indicates brightness of the optical component imaging. Generally, brightness is high at the center and low in the periphery.

The utility model also provides a head-mounted display device, which includes: a transparent protective layer 70 and an optical assembly as described above, wherein the transparent protective layer 70 is provided on the light exit surface of the light source 10. Specifically, the transparent protective layer 70 covers the light exit surface of the light source 10 to protect the light source 10 without influencing emission of light beams. For example, the transparent protective layer 70 may be a glass protector plate, with a thickness greater than 0.3 mm.

The present disclosure also provides an optical system. The optical system includes a display 60 and an optical lens assembly as described above. The display 60 emits light rays 610, which are received by the display. The total length of the optical system is less than 6 mm. A transparent protector plate 70 is provided on the light exit surface of the display 60 to protect the light exit surface thereof. The refractive index of the lens body 10 is n, the dispersion coefficient is v, and the thickness is T, which satisfy $1.45<n<1.60$, $50<v<75$, and $2\text{ mm}<T<6\text{ mm}$. Here, the range of the thickness T refers to the range from the thinnest point to the thickest point of the lens body 10.

Here, for the detailed implementations of the optical system, reference may be made to the embodiment of the optical lens assembly, and details are not repeated here.

Further, the optical system further includes a quarter-wave plate, which is provided on the light exit surface of the display 60. The light rays emitted by the display 60 are circularly polarized light. After passing through the quarter wave plate, the polarization state of the light rays is ensured to be converted into linearly polarized light rays. Both light rays in the first polarization state and light rays in the second polarization state may be linear polarized light rays, with different polarization directions.

The present disclosure also provides a head-mounted display device. The head-mounted display device includes a housing and an optical lens assembly as described above. The optical lens assembly may be provided on the housing; alternatively, it may also be wrapped in a half-wrapped manner. With the protection of the shell, the functions of dustproof and waterproof may be realized.

Here, for the detailed implementations of the head-mounted display device, reference may be made to the embodiments of the optical lens assembly, which will not be repeated here.

The above are only preferred embodiments of the present disclosure, and are not intended to limit the patent scope of the present disclosure.

Under the inventive concept of the present disclosure, the equivalent structural alternations made according to the description of the present disclosure and the contents of the accompanying drawings, or directly/indirectly applications thereof in other relevant technical fields all fall within the patent protection scope of the present disclosure.

The invention claimed is:

1. An optical lens assembly, comprising in order:

a transflective film, a lens body, a quarter waveplate, a first polarizing reflector, and a second polarizing reflector;

wherein:

the first polarizing reflector comprises on a plurality of first regions and a second plurality of regions, wherein:

the first regions passed light of a first linear polarization state and a second linear polarization state, the second region reflects light in the first linear polarization state and transmits light in the second linear polarization state, the second polarizing reflector reflects light in the second linear polarization state and transmits light in the first linear polarization state, and the first linear polarization state is perpendicular to the second linear polarization state.

2. The optical lens assembly of claim 1, wherein the first regions and the second regions are provided in an alternating sequence.

3. The optical lens assembly of claim 1, wherein the first regions and the second regions are evenly distributed in the first polarizing reflector.

4. The optical lens assembly of claim 1, wherein a total area occupied by the second regions is larger than a total area occupied by the first regions.

5. The optical lens assembly of claim 1, wherein the first regions are of the same area size as the second region.

6. The optical lens assembly of claim 1, wherein both the first region and the second regions are of square shapes.

7. The optical lens assembly of claim 1, wherein the optical lens assembly further comprises a stray-light eliminator provided sequentially after the second polarizing reflector.

8. The optical lens assembly of claim 7, wherein the stray-light eliminator is a polarizer that transmits light in the first linear polarization state.

9. An optical system, comprising: a display; and the optical lens assembly of claim 1, wherein the optical lens assembly is less than 6 mm thick.

10. A head-mounted display device, comprising: a housing; and the optical system of claim 9 provided in the housing.

* * * * *